(12) United States Patent
de Goycoechea

(10) Patent No.: US 11,323,187 B2
(45) Date of Patent: May 3, 2022

(54) SMART NODES FOR MONITORING A PASSIVE DISTRIBUTED ANTENNA SYSTEM

(71) Applicant: Ricardo Matias de Goycoechea, Cordoba (AR)

(72) Inventor: Ricardo Matias de Goycoechea, Cordoba (AR)

(73) Assignee: Fiplex Communications, Inc., Miami, FL (US)

( * ) Notice: Subject to any disclaimer, the term of this patent is extended or adjusted under 35 U.S.C. 154(b) by 21 days.

(21) Appl. No.: 17/071,497

(22) Filed: Oct. 15, 2020

(65) Prior Publication Data

US 2021/0111814 A1 Apr. 15, 2021

Related U.S. Application Data

(60) Provisional application No. 62/915,128, filed on Oct. 15, 2019.

(51) Int. Cl.
| | |
|---|---|
| *H04B 3/46* | (2015.01) |
| *H04B 17/13* | (2015.01) |
| *H04B 17/23* | (2015.01) |
| *H04B 1/04* | (2006.01) |
| *H04B 17/10* | (2015.01) |

(52) U.S. Cl.
CPC ............... *H04B 17/13* (2015.01); *H04B 1/04* (2013.01); *H04B 17/102* (2015.01); *H04B 17/23* (2015.01); *H04B 2001/0408* (2013.01)

(58) Field of Classification Search
CPC ........ H04B 17/13; H04B 1/04; H04B 17/102; H04B 17/23; H04B 2001/0408
USPC .......................................... 375/224, 228, 262
See application file for complete search history.

(56) References Cited

U.S. PATENT DOCUMENTS

| | | | | |
|---|---|---|---|---|
| 2003/0087672 | A1* | 5/2003 | Kattukaran | H04W 88/085 455/557 |
| 2007/0135042 | A1* | 6/2007 | Shift | H01Q 1/50 455/13.3 |
| 2015/0091755 | A1* | 4/2015 | Chawgo | H01Q 1/246 342/359 |
| 2016/0315706 | A1* | 10/2016 | Yeo | H04B 10/40 |
| 2019/0068301 | A1* | 2/2019 | Getto | H04L 67/12 |

* cited by examiner

*Primary Examiner* — Don N Vo
(74) *Attorney, Agent, or Firm* — The Brickell IP Group, PLLC; Rafael Perez-Pineiro

(57) ABSTRACT

A system for monitoring passive components of a passive distributed antenna system is disclosed. The system includes a bi-directional amplifier, a public safety monitor coupled to and in communication with the bi-directional amplifier, and at least one smart node coupled to and in communication with the public safety monitor. The at least one smart node is positioned within the passive distributed antenna system and includes a processor, connected to or coupled to a spectrum analysis module configured to monitor signal characteristic information of at least one radio frequency signal passing through the passive distributed antenna system. The processor is configured to transmit the signal characteristic information to the public safety monitor and the public safety monitor generates system performance information based on a signal at the bi-directional amplifier and the transmitted signal characteristic information.

15 Claims, 7 Drawing Sheets

ND ANTENNA SYSTEM

SMART NODES FOR MONITORING A PASSIVE DISTRIBUTED ANTENNA SYSTEM

CROSS REFERENCE TO RELATED APPLICATIONS

This application claims the benefit of U.S. Provisional Application No. 62/915,128 filed Oct. 15, 2019, the disclosure of which is hereby incorporated herein by reference in its entirety.

FIELD OF THE DISCLOSURE

This disclosure relates generally to the field of distributed antenna systems.

BACKGROUND

In a distributed antenna system (DAS), a base transceiver station connects with a principal or master unit of the DAS, and the master unit in turn is connected to one or more secondary or remote units. Each remote unit may be in turn be connected to one or more antennas. In some implementations, a plurality of antennas may individually provide local coverage within a broader coverage area.

A passive public safety DAS generally comprises several passive components requiring continuous monitoring to ensure system functionality and to identify a problem with a passive component of the system. A DAS may include antennas, couplers, splitters, and tappers wherein the failure of one of these passive components can cause the DAS to become inoperable.

Present systems include devices for monitoring the status of passive components in a DAS signal distribution network. One such system is disclosed in U.S. Patent Pub. No. 2019/0068301A1, which describes a device referred to as a Smart Node, which has the capability of monitoring signal characteristics information such as voltage standing wave ratio (VSWR).

Since any indoor coverage system requires monitoring, the VSWR monitoring is important but is not sufficient to meet the public safety network needs, as well as other non-public safety applications. Measuring the VSWR allows such Smart Node to inform the Public Safety Monitor (PSM) if a passive component, such as a coaxial cable or an antenna, was removed or is not working properly, but does not allow the network administrator or the "Authority Having Jurisdiction" (AHJ) to detect if the losses in the passive network distribution fluctuate or have been modified over time, which has a serious impact on the indoor coverage propagation footprint.

In light of the foregoing, there is a need in the art for an improved method and system that enables to detect whether losses in the passive distribution network fluctuate or have been modified over time.

BRIEF SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

A system for monitoring passive components of a passive distributed antenna system is disclosed. In one implementation, the system may include a bi-directional amplifier, a public safety monitor coupled to and in communication with the bi-directional amplifier, and at least one smart node coupled to and in communication with the public safety monitor. The at least one smart node may be positioned within the passive distributed antenna system and may include a processor, connected to or coupled to a spectrum analysis module configured to monitor signal characteristic information of at least one radio frequency signal passing through the passive distributed antenna system. The processor may be configured to transmit the signal characteristic information to the public safety monitor and the public safety monitor may generate system performance information based on a signal at the bi-directional amplifier and the transmitted signal characteristic information.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

DETAILED DESCRIPTION OF THE DISCLOSURE

Figure 1:
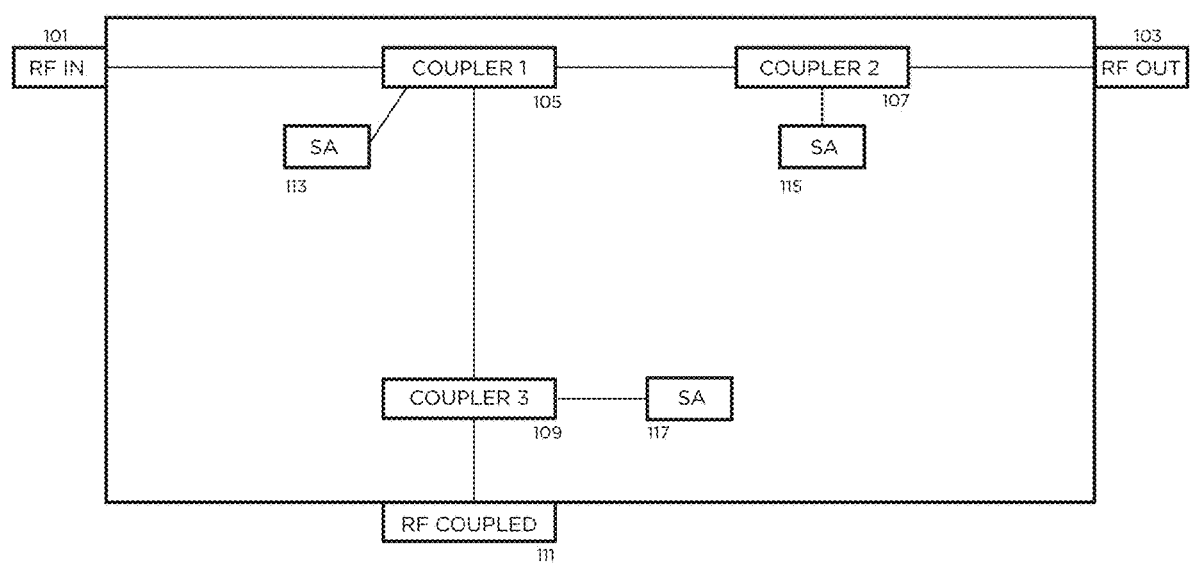
FIG. 1 illustrates a smart node with spectrum analyzer modules in accordance with one embodiment.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

The exemplary implementations disclosed herein include improvements to the prior art and in particular to the Smart Nodes disclosed in U.S. Patent Pub. No. 2019/0068301A1, which is incorporated herein by reference in its entirety. Those Smart Nodes have the capability of monitoring signal characteristics information such as voltage standing wave ratio (VSWR). However, measuring the VSWR does not allow measuring the uplink (UL) power coming from each antenna in the DAS on a channel basis (as opposed to broadband power). Measuring the UL power on a channel basis, as described in the present disclosure, allows the detection of interferences that degrade the indoor system performance, and also allows the detection of the power received by a specific channel and/or specific time slot on a multi Smart Node synchronized measurement scheme that also allows the PSM or other software based solution or the AHJ to determine the location, by power and time triangulation, of a specific UL transmitter that is located within the indoor coverage area, and to identify which UL signal is being received from terminal equipment (e.g., radios) by the antennas of the indoor coverage system.

The exemplary implementations disclosed herein include incorporating into a Smart Node dedicated circuitry that allows the Smart Node to perform UL and downlink (DL) spectrum analysis. For example, one or multiple "spectrum analysis capable circuitry" (SA) may be incorporated into a Smart Node in order to perform spectrum analysis of the signals coming through an input RF port (RF IN), of the signals being fed to or coming from/reflected from an output RF port (RF OUT), and/or of signals being fed to or coming from/reflected from a coupled RF port (RF COUPLED). Spectrum analysis may be defined as the capability to determine specific RF spectrum information, such as, but not limited to, power per channel and/or per time slot, or RF signal delay, among others, of specific channels, with the capability of selecting specific channel bandwidths for conducting such spectral analysis.

In one implementation, the disclosed systems and methods detect faults in a passive distributed antenna system. The passive distributed antenna system may include antennas, radiofrequency transmission lines such as coaxial cables, and radiofrequency power distribution devices such as splitters and couplers.

Referring now to FIG. 1, a Smart Node (SN) may include an RF IN port (101), and RF OUT port (103), and RF COUPLED port (111), three couplers (105, 107 and 111), and three SA modules (113, 115 and 117). A first COUPLER 1 (105) may direct a part of the signals coming from RF IN (101) to COUPLER 3 (109). COUPLER 1 (105) also may direct the remaining part of the signal coming from RF IN (101) to COUPLER 2 (107), with a first SA module (113), being coupled or connected to COUPLER 1 (105) and performing spectrum analysis of the signal coming from RF IN (101). A second COUPLER 3 (109) may be used to direct a portion of the signal being fed to or coming from/reflected from the RF COUPLED port (111) to SA module (117), with SA module (117) being coupled or connected to COUPLER 3 (109), to perform spectrum analysis of the signal being fed to or coming from/reflected from the RF COUPLED port (111). A third COUPLER 2 (107) may be used to direct a portion of the signal being fed to or coming from/reflected from RF OUT (103) to SA module (115), with SA module (115) being coupled or connected coupled to COUPLER 2 (107) and performing spectrum analysis of the signal being fed to or coming from/reflected from the RF OUT (103). The resulting spectrum analysis information from each one of the different SA modules may be collected by a single or multiple processing units that can be internal or external to the SN, and the spectral information may be processed or transmitted to another device via any transmission method such as modulated carrier sent by any of the SN RF ports, by an Ethernet connection, or by any other physical connection, such that the resulting spectrum analysis can be used for different purposes, including the detection of interferences that degrade the indoor system performance, and also detecting the power received by a specific channel and/or specific time slot on a multi Smart Node synchronized measurement scheme, which also allows the PSM or other software based solution or the AHJ to determine the location, by power and time triangulation, of a specific UL transmitter that is located within an indoor coverage area, and to identify which UL signal is being received from terminal equipment (e.g., radios) by the antennas of the indoor coverage system.

The SA module may be implemented as a low cost ISM receiver, such as the Si4313 receiver commercially available from Silicon Labs, together with a microcontroller and other devices such as resistor, capacitors, etc. The ISM receiver may be controlled by a microcontroller such that the receiver may tune to specific channels. Through an RSSI function embedded in the ISM receiver, the microcontroller may obtain power readings on a channel basis or per channel. The ISM receiver may hop from channel to channel taking successive readings in order to gather the power measurements on a channel by channel basis. By configuring the SA module (or spectrum analysis capable circuitry) to obtain power measurements in a predetermined or synchronized manner, the SA can obtain power levels at specific times, enabling the SA module to ascertain or determine the power per channel per time slot. The SA module can, alternatively, compare the signal power received by different nodes at a particular instance, further enabling the SA module to determine phase shifts. All of the information gathered by the SA module may be transmitted to the Public Safety Monitor and can be used by the end user or operator of the system.

Figure 2:
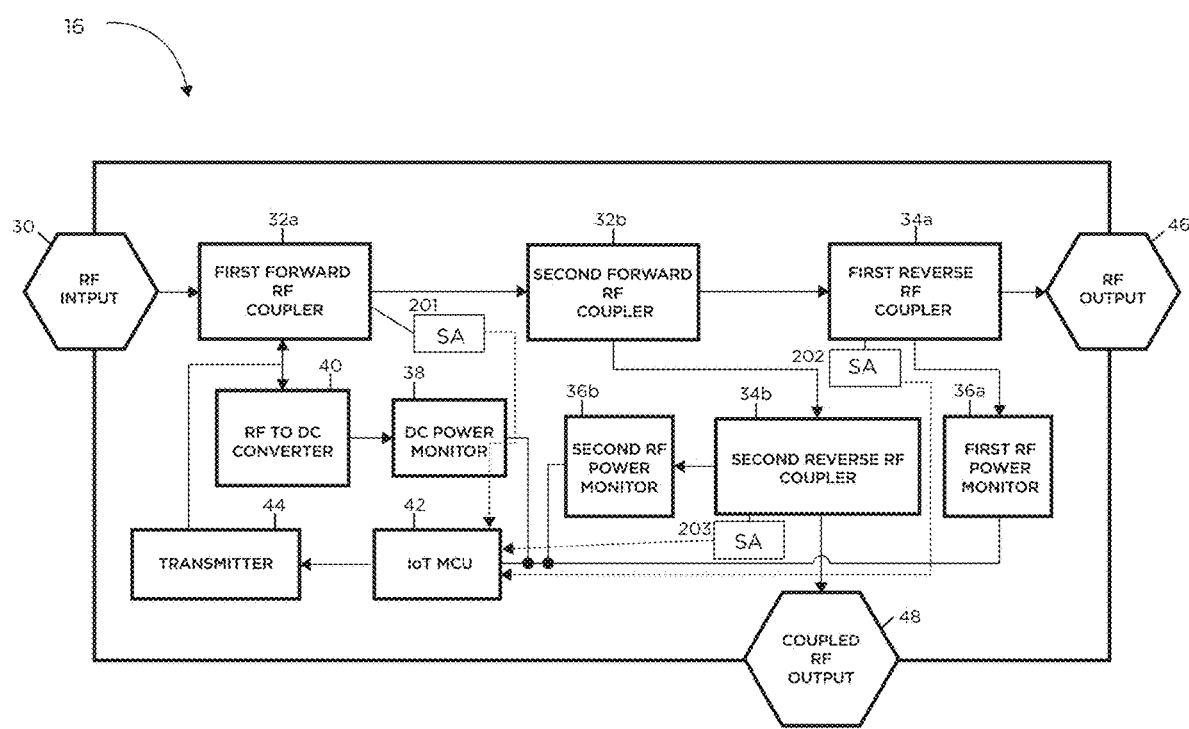
FIG. 2 illustrates hardware and software components including spectrum analyzer modules used to implement an embodiment of the systems and methods of the present disclosure.

FIG. 2 is a diagram illustrating hardware and software components capable of being utilized to implement an embodiment of the systems and methods of the present disclosure. The smart node 16 can operate in the 100 MHz to 1 GHz frequency range, such that the system can comply with public safety DAS equipment (which generally operates in the 100 MHz to 1 GHz range). The frequency range can vary depending on the type of network or application of the DAS. As shown in FIG. 2, the smart node 16 can include a radiofrequency (RF) input port 30, a first forward RF coupler 32a, a second forward RF coupler 32b, a first reverse RF coupler 34a, a second reverse RF coupler 34b, a first RF power monitor 36a, a second RF power monitor 36b, a direct current (DC) power monitor 38, an RF to DC converter 40, an IoT microcontroller (MCU) 42, a transmitter 44, an RF output port 46 and a coupled RF output 48.

The RF input port 30 can be coupled to the first forward RF coupler 32a. The RF input port 30 receives an antenna signal which is transmitted to the first forward RF coupler 32a. The first forward RF coupler 32a can be coupled to the second forward RF coupler 32b and to the RF to DC converter 40 for harvesting energy from RF signals. The RF to DC converter 40 collects (harvests) RF energy and outputs DC power for the active components within the smart node 16. Additionally, in another embodiment of the invention, the RF to DC converter 40 can store energy in an energy storage device 72 (see FIG. 4, discussed below), such as a battery or a capacitor. The RF to DC converter 40 can comprise circuitry for capturing over-the-air (OTA) signals, while the RF signals it harvests are transmitted via a coaxial cable. Accordingly, the RF to DC converter 40 is used unconventionally by harvesting RF energy from RF signals transmitted via a coaxial cable, instead of OTA signals. The RF to DC converter 40 can be coupled to a DC power monitor 38. The DC power monitor 38 monitors the DC power of a signal after the signal is transmitted through the RF to DC converter 40.

The second forward RF coupler 32b can be coupled to a first reverse RF coupler 34a and to a second reverse RF coupler 34b. The first reverse RF coupler 34a can be coupled to the RF output port 46 and to the first RF power monitor 36a. The second reverse RF coupler can be coupled to the second RF power monitor 36b and to the coupled RF output port 48. The first RF power monitor 36a reflects power via the first reverse RF coupler 34a and the second RF power monitor 36b reflects power via the second reverse RF coupler 34b. Additionally, in an embodiment of the invention, a second forward RF coupler 62b can be coupled to a forward power measurement module 68 rather than the second reverse RF coupler 34b wherein an RF transceiver 76 is coupled to a coupled RF output port 80.

The IoT MCU 42 can be coupled to the DC power monitor 38, the first RF power monitor 36a, and the second RF power monitor 365. The IoT MCU 42 processes the forward and reflected power measured by these power monitors 36a, 365, and 38 and generates signal characteristic information regarding the antenna signal to the transmitter 44. The transmitter 44 transmits the signal characteristic information to the RF input port 30 in the reverse direction of the incoming RF signal to the modem 20, where it can be communicated further to the user 28 via the modem 20.

Referring to FIG. 2, a first SA module (201) may be coupled or connected to RF coupler 32a to perform spectrum analysis on the signals coming from RF input 30 and managing the resulting spectrum information with IoT microcontroller 42. A second SA module (202) may be coupled or connected to RF coupler 34a to perform spectrum analysis of the signals being fed to or coming from/reflected from RF output 46 and managing the resulting spectrum information with IoT microcontroller 42. A third SA module (203) may be coupled or connected to RF coupler 34b to perform spectrum analysis of the signals being fed to or coming from/reflected from RF coupled output 48 and managing the resulting information with IoT microcontroller 42.

Figure 3:
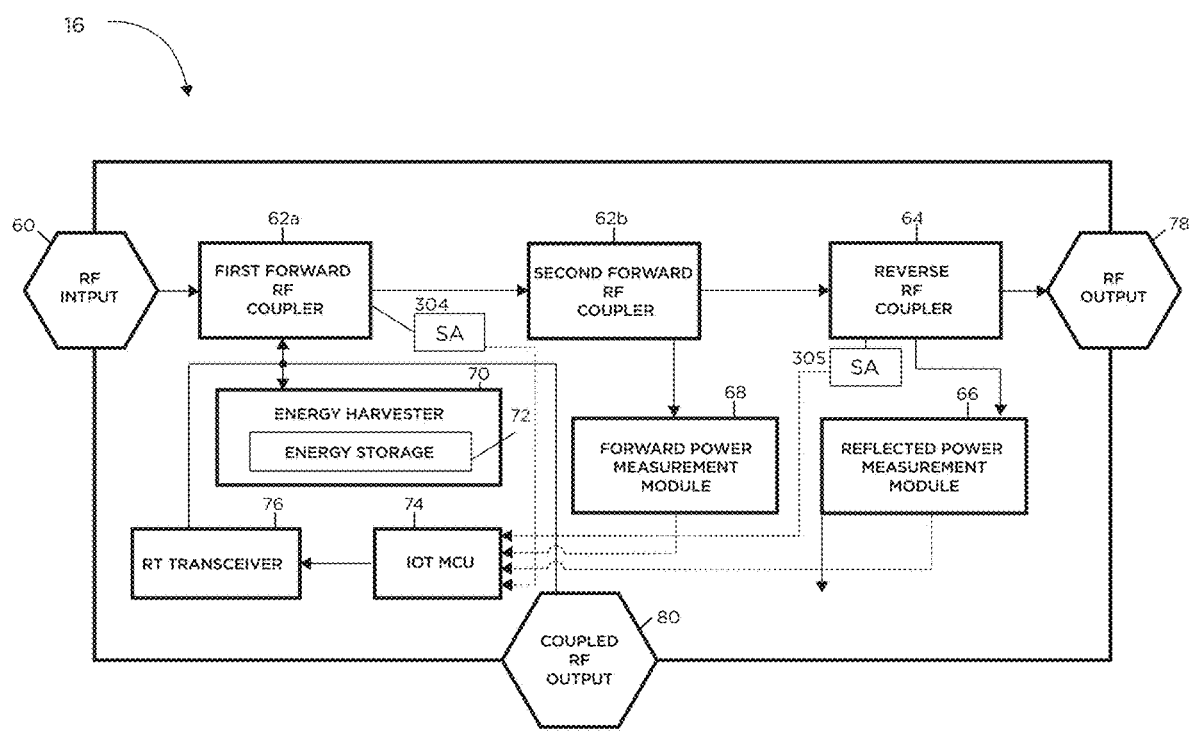
FIG. 3 illustrates hardware and software components including spectrum analyzer modules used to implement another embodiment of the systems and methods of the present disclosure.

As shown in FIG. 3 in another embodiment of the systems and methods of the present disclosure, the smart node 16 can include an RF input port 60, a first forward RF coupler 62a, a second forward RF coupler 62b, a reverse RF coupler 64, a reflected power measurement module 66, a forward power measurement module 68, an energy harvester 70 including an energy storage 72, an IoT MCU 74, an RF transceiver 76, an RF output port 78 and a coupled RF output port 80. The dotted lines denote monitor signals and control signals. The RF input port 60 can be coupled to the first forward RF coupler 62a. The RF input port 60 can receive a signal from the PSM 14 and the smart node 16 can transmit monitor signals to the PSM 14 via the RF input port 60. Alternatively, the RF input port 60 can receive a signal from another smart node 16. The first forward RF coupler 62a can be coupled to the second forward RF coupler 62b and to the energy harvester 70 for harvesting RF energy. The energy harvester 70 harvests RF energy for the active components within the smart node 16. Additionally, the energy harvester 70 can store energy in an energy storage device 72, such as a battery or a capacitor.

The second forward RF coupler 62b can be coupled to a reverse RF coupler 64 and to the forward power measurement module 68. The reverse RF coupler 64 can be coupled to the RF output port 78 and to the reflected power measurement module 66. The RF output port 78 can transmit a signal to another smart node 16 or monitor an antenna 18. Each of the forward power measurement module 68 and the reflected power measurement module 66 can transmit monitor signals and control signals to the IoT MCU 74. The IoT MCU 74 processes the forward and reflected power measured respectively by the forward power measurement module 68 and the reflected power measurement module 66 and generates signal characteristic information regarding the antenna signal to the RF transceiver 76. The RF transceiver 76 transmits the signal characteristic information to the RF input port 60 where it can be communicated further to the modem 20 and as such to the user 28.

Referring to FIG. 3, a first SA module (304) may be coupled or connected to RF coupler 62a to perform spectrum analysis of the signals coming from RF input 60 and managing the resulting spectrum information with IoT microcontroller 74. A second SA module (305) may be coupled or connected to RF coupler 64 to perform spectrum analysis of the signals being fed to or coming from/reflected from RF output 78 and managing the resulting spectrum information with IoT microcontroller 74.

Figure 4:
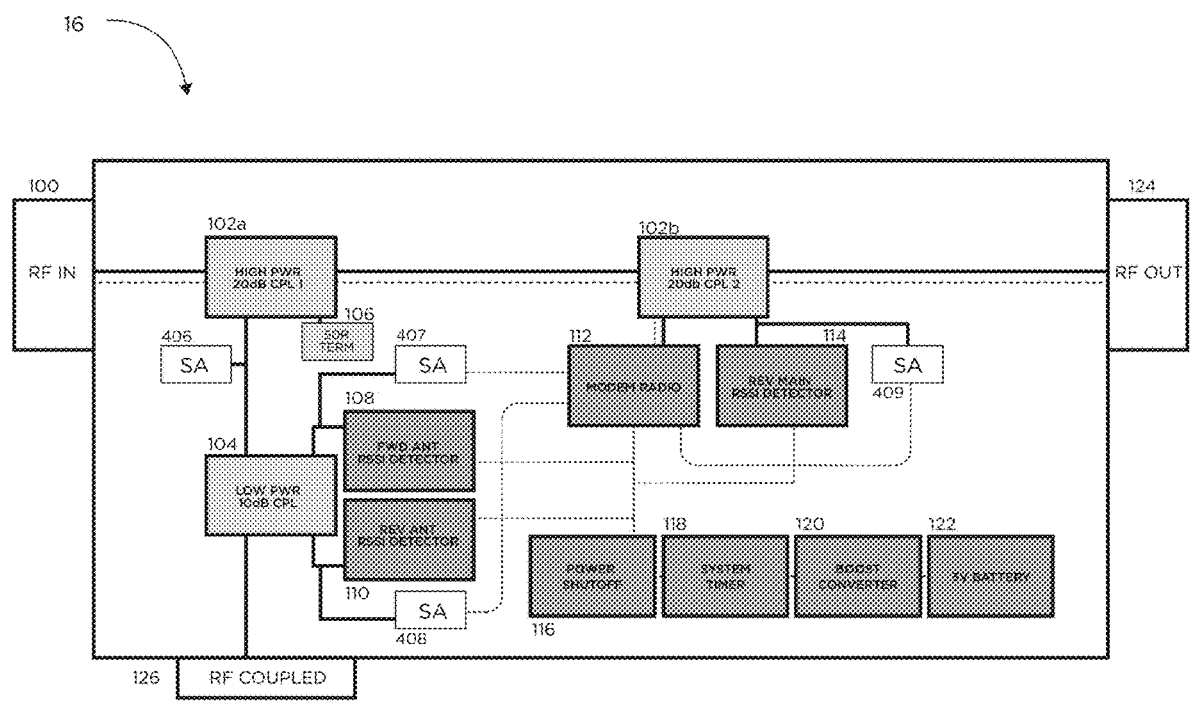
FIG. 4 illustrates hardware and software components including spectrum analyzer modules used to implement another embodiment of the systems and methods of the present disclosure.

As shown in FIG. 4, in another embodiment of the systems/methods of the present disclosure, the smart node 16 can include an RF input port 100; a first high power 20 dB coupler 102a; a second high power 20 dB coupler 102b; a low power 10 dB coupler 104; a 50.OMEGA. RF termination 106; a forward antenna receiver signal strength indication (RSSI) detector 108; a reverse antenna RSSI detector 110; a modem radio 112; a reverse main RSSI detector 114; a power shutoff 116; a system timer 118; a boost converter 120; a 3 volt battery 122; an RF coupled output port 126; and an RF output port 124. The dotted lines denote monitor signals and control signals.

The RF input port 100 can be coupled to the first high power 20 dB coupler 102a. The RF input port 100 can receive a signal from the PSM 14 and the smart node 16 can transmit monitor signals to the PSM 14 via the RF input port 100. Alternatively, the RF input port 100 can receive a signal from another smart node 16.

The smart node 16 can be energized by the 3 volt battery 122. The 3 volt battery 122 can be coupled to a boost converter 120 that boosts the voltage to 3.3 volts. The system timer 118 provides for intervals of time wherein the smart node 16 enters different modes. For example, the system timer 118 can provide for an interval of time wherein the smart node 16 can enter an operational mode (i.e., an active mode) and an interval of time wherein the smart node 16 can enter a low current mode (i.e., a sleep mode). The power shutoff 116 receives a control signal from the system timer 118 and based on the received control signal can disconnect power to the elements of the smart node 16.

The forward antenna RSSI detector 108 can be coupled to the low power 10 dB coupler 104. The forward antenna RSSI detector 108 can measure an RF level transmitted forwardly through the RF coupled port 126 (i.e., coupled forward power) and can transmit monitor and control signals indicative of the coupled forward power to the modem radio 112. The reverse antenna RSSI detector 110 can also be coupled to the low power 10 dB coupler 104. The reverse antenna RSSI detector 110 can measure an RF level reflected back from the RF coupled port 126 (i.e., coupled reverse power) and can transmit monitor and control signals indicative of the coupled reverse power to the modem radio 112. The reverse main RSSI detector 114 can be coupled to the second high power 20 dB coupler 102b. The reverse main RSSI detector 114 can measure an RF level reflected back from the RF output port 124 (i.e., main reverse power) and can transmit monitor and control signals indicative of the main reverse power to the modem radio 112.

The modem radio 112 can be coupled to the second high power 20 dB coupler 102b. The modem radio 112 can receive monitor and control signals indicative of (a) the coupled forward power from the forward antenna RSSI detector 108, (b) the coupled reverse power from the reverse antenna RSSI detector 110, and (c) the main reverse power from the reverse main RSSI detector 114 and can transmit, based on the received monitor and control signals, signal characteristic information regarding the antenna signal to the PSM 14 via the coaxial network.

Referring to FIG. 4, a first module SA (406) may be coupled or connected to coupler 102a to perform spectrum analysis of the signals coming from RF input 100 and managing the resulting spectrum information with modem radio 112. A second SA module (407) may be coupled or connected to coupler 104 to perform spectrum analysis of the signals coming from coupler 102a and managing the resulting spectrum information with modem radio 112. A third SA module (408) may be coupled or connected to coupler 104 to perform spectrum analysis of the signals being fed to or coming from/reflected from RF coupled port 126 and managing the resulting information with modem radio 112. A fourth module SA (409) may be coupled or connected to coupler 102b to perform spectrum analysis of the signals being fed to or coming from/reflected from RF output 124 and managing the resulting information with modem radio 112.

Figure 5:
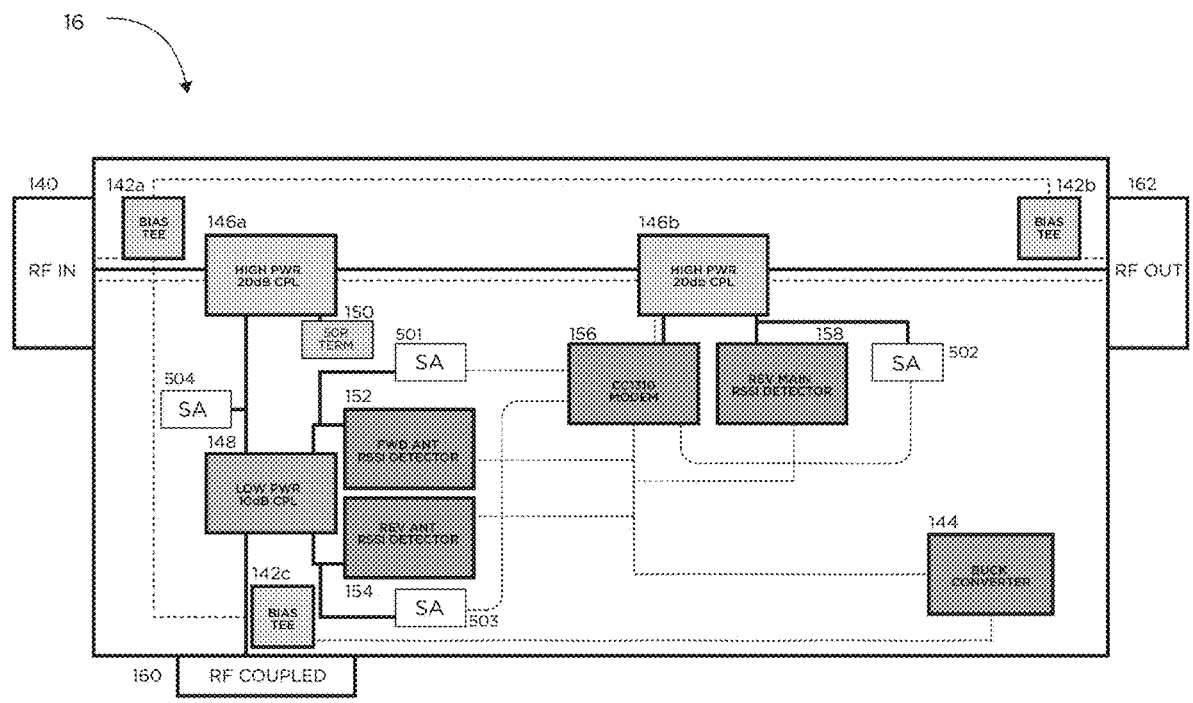
FIG. 5 illustrates hardware and software components including spectrum analyzer modules used to implement another embodiment of the systems and methods of the present disclosure.

As shown in FIG. 5, in another embodiment of the systems/methods of the present disclosure, the smart node 16 can include an RF input port 140; bias tees 142a, 142b and 142c; a buck converter 144; a first high power 20 dB coupler 146a; a second high power 20 dB coupler 146b; a low power 10 dB coupler 148; a 50.OMEGA. RF termination 150; a forward antenna RSSI detector 152; a reverse antenna RSSI detector 154; a modem 156; a reverse main RSSI detector 158; an RF coupled output port 160; and an RF output port 162. The dotted lines denote monitor signals and control signals.

The RF input port 140 can be coupled to the first high power 20 dB coupler 146a. The RF input port 140 can receive a signal from the PSM 14 and the smart node 16 can transmit monitor signals to the PSM 14 via the RF input port 140. Alternatively, the RF input port 140 can receive a signal from another smart node 16.

The smart node 16 can be energized from a direct feed RF line via the bias tees 142a, 142b, and 142c and the buck converter 144. The buck converter 144 lowers the voltage to 3.3 volts. The bias tee and buck converter power supply provides for the smart node 16 to enter a continuous operational mode.

The forward antenna RSSI detector 152 can be coupled to the low power 10 dB coupler 148. The forward antenna RSSI detector 152 can measure an RF level transmitted forwardly through the RF coupled port 160 (i.e., coupled forward power) and can transmit monitor and control signals indicative of the coupled forward power to the modem 156 and the buck converter 144. The reverse antenna RSSI detector 154 can also be coupled to the low power 10 dB coupler 148. The reverse antenna RSSI detector 154 can measure an RF level reflected back from the RF coupled port 160 (i.e., coupled reverse power) and can transmit monitor and control signals indicative of the coupled reverse power to the modem 156. The reverse main RSSI detector 158 can be coupled to the second high power 20 dB coupler 146b. The reverse main RSSI detector 158 can measure an RF level reflected back from the RF output port 162 (i.e., main reverse power) and can transmit monitor and control signals indicative of the main reverse power to the modem 156.

The modem 156 can be coupled to the second high power 20 dB coupler 146b. The modem 156 can receive monitor and control signals indicative of (a) the coupled forward power from the forward antenna RSSI detector 152, (b) the coupled reverse power from the reverse antenna RSSI detector 154, and (c) the main reverse power from the reverse main RSSI detector 158 and can transmit, based on the received monitor and control signals, signal characteristic information regarding the antenna signal to the PSM 14 via the coaxial network.

Referring to FIG. 5, a first SA module (509) may be coupled or connected to coupler 146a to perform spectrum analysis of the signals coming from RF input 140 and managing the resulting spectrum information with modem 156. A second SA module (501) may be coupled or connected to coupler 148 to perform spectrum analysis of the signals coming from coupler 146a and managing the resulting spectrum information with modem 156. A third SA module (503) may be coupled or connected to coupler 148 to perform spectrum analysis of the signals being fed to or coming from/reflected from RF coupled port 160 and managing the resulting information with modem 156. A fourth SA module (502) may be coupled or connected to coupler 146b to perform spectrum analysis of the signals being fed to or coming from/reflected from RF output 162 and managing the resulting information with modem 156.

Figure 6:
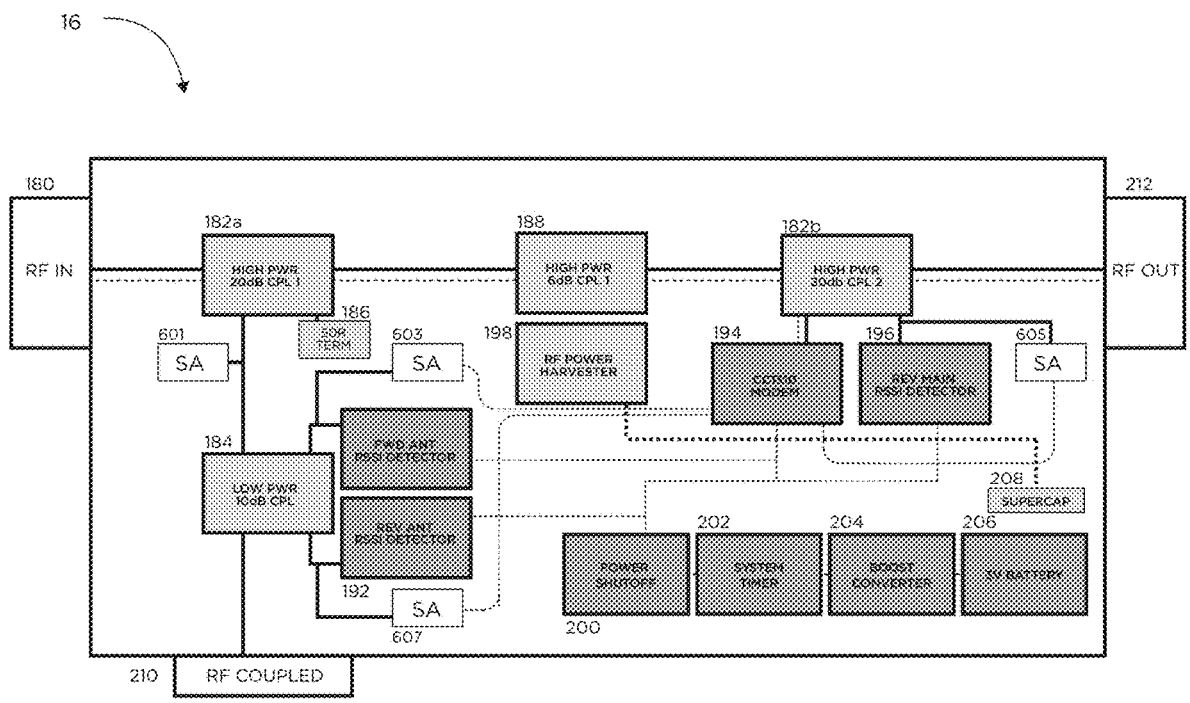
FIG. 6 illustrates hardware and software components including spectrum analyzer modules used to implement another embodiment of the systems and methods of the present disclosure.

As shown in FIG. 6, in another embodiment of the systems/methods of the present disclosure, the smart node 16 can include an RF input port 180; a first high power 20 dB coupler 182a; a second high power 20 dB coupler 182b; a low power 10 dB coupler 184; a 50.OMEGA. RF termination 186; a high power 6 dB coupler 188; a forward antenna RSSI detector 190; a reverse antenna RSSI detector 192; a modem 194; a reverse main RSSI detector 196; an RF power harvester 198; a power shutoff 200; a system timer 202; a boost converter 204; a 3 volt battery 206; a supercapacitor 208; an RF coupled output port 210; and an RF output port 212. The dotted lines denote monitor signals and control signals.

The RF input port 180 can be coupled to the first high power 20 dB coupler 182a. The RF input port 180 can receive a signal from the PSM 14 and the smart node 16 can transmit monitor signals to the PSM 14 via the RF input port 180. Alternatively, the RF input port 180 can receive a signal from another smart node 16.

The smart node 16 can be energized by the RF power harvester 198. The RF power harvester 198 is coupled to a direct feed of a primary high power RF line. The RF power harvester 198 charges the supercapacitor 208 wherein the supercapacitor 208 energizes the smart node 16 until the supercapacitor 208 is discharged. In the event the supercapacitor 208 is discharged, the smart node 16 can be energized by the backup 3 volt battery 206. The 3 volt battery 206 can be coupled to a boost converter 204 that boosts the voltage to 3.3 volts. The system timer 202 provides for intervals of time wherein the smart node 16 can enter different modes. For example, the system timer 202 can provide for an interval of time wherein the smart node 16 can enter an operational mode (i.e., an active mode) and an interval of time wherein the smart node 16 can enter a low current mode (i.e., a asleep mode). The power shutoff 200 receives a control signal from the system timer 202 and based on the received control signal can disconnect power to the elements of the smart node 16.

The forward antenna RSSI detector 190 can be coupled to the low power 10 dB coupler 184. The forward antenna RSSI detector 190 can measure an RF level transmitted forwardly through the RF coupled port 210 (i.e., coupled forward power) and can transmit monitor and control signals indicative of the coupled forward power to the modem 194. The reverse antenna RSSI detector 192 can also be coupled to the low power 10 dB coupler 184. The reverse antenna RSSI detector 192 can measure an RF level reflected back from the RF coupled port 210 (i.e., coupled reverse power) and can transmit monitor and control signals indicative of the coupled reverse power to the modem 194. The reverse main RSSI detector 196 can be coupled to the second high power 20 dB coupler 182b. The reverse main RSSI detector 196 can measure an RF level reflected back from the RF output port 212 (i.e., main reverse power) and can transmit monitor and control signals indicative of the main reverse power to the modem 194.

The modem 194 can be coupled to the second high power 20 dB coupler 182b. The modem 194 can receive monitor and control signals indicative of (a) the coupled forward power from the forward antenna RSSI detector 190, (b) the coupled reverse power from the reverse antenna RSSI detector 192, and (c) the main reverse power from the reverse main RSSI detector 196 and can transmit, based on the received monitor and control signals, signal characteristic information regarding the antenna signal to the PSM 14 via the coaxial network.

Referring to FIG. 6, a first SA module (601) may be coupled or connected to coupler 182a to perform spectrum analysis of the signals coming from RF input 180 and managing the resulting spectrum information with modem 194. A second SA module (603) may be coupled or connected to coupler 184 to perform spectrum analysis of the signals coming from coupler 182a and managing the resulting spectrum information with modem 194. A third SA module (607) may be coupled or connected to coupler 184 to perform spectrum analysis of the signals being fed to or coming from/reflected from 210 and managing the resulting information with modem 194. A fourth SA module (605) may be coupled or connected to coupler 182b to perform spectrum analysis of the signals being fed to or coming from/reflected from RF output 212 and managing the resulting information with modem 194.

Figure 7:
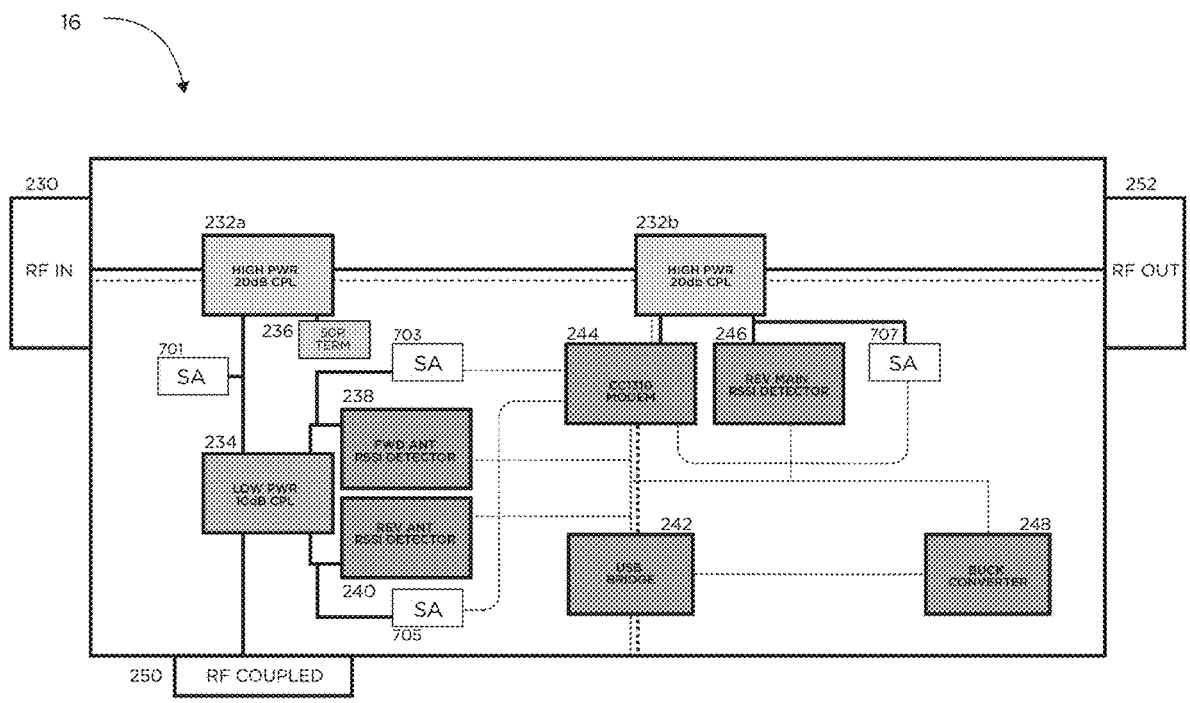
FIG. 7 illustrates hardware and software components including spectrum analyzer modules used to implement another embodiment of the systems and methods of the present disclosure.

As shown in FIG. 7, in another embodiment of the systems/methods of the present disclosure, the smart node 16 can include an RF input port 230; a first high power 20 dB coupler 232a; a second high power 20 dB coupler 232b; a low power 10 dB coupler 234; a 50.OMEGA. terminated RF multiplexer 236; a forward antenna RSSI detector 238; a reverse antenna RSSI detector 240; a universal serial bus (USB) bridge 242; a modem 244; a reverse main RSSI detector 246; a buck converter 248; an RF coupled output port 250; and an RF output port 252. The dotted lines denote monitor signals and control signals.

The RF input port 230 can be coupled to the first high power 20 dB coupler 232a. The RF input port 230 can receive a signal from the PSM 14 and the smart node 16 can transmit monitor signals to the PSM 14 via the RF input port 230. Alternatively, the RF input port 230 can receive a signal from another smart node 16. The smart node 16 can be energized by the USB bridge 242. The USB bridge 242 is coupled to a buck converter 248 that lowers the voltage to 3.3 volts. The buck converter power supply provides power for the smart node 16 to enter a continuous operational mode (i.e., an active mode).

The forward antenna RSSI detector 238 can be coupled to the low power 10 dB coupler 234. The forward antenna RSSI detector 238 can measure an RF level transmitted forwardly through the RF coupled port 250 (i.e., coupled forward power) and can transmit monitor and control signals indicative of the coupled forward power to the modem. The reverse antenna RSSI detector 240 can also be coupled to the low power 10 dB coupler 234. The reverse antenna RSSI detector 240 can measure an RF level reflected back from the RF coupled port 250 (i.e., coupled reverse power) and can transmit monitor and control signals indicative of the coupled reverse power to the modem 244. The reverse main RSSI detector 246 can be coupled to the second high power 20 dB coupler 232b. The reverse main RSSI detector 246 can measure an RF level reflected back from the RF output port 252 (i.e., main reverse power) and can transmit monitor and control signals indicative of the main reverse power to the modem 244.

The modem 244 can be coupled to the second high power 20 dB coupler 232b. The modem 244 can receive monitor and control signals indicative of (a) the coupled forward power from the forward antenna RSSI detector 238, (b) the coupled reverse power from the reverse antenna RSSI detector 240, and (c) the main reverse power from the reverse main RSSI detector 246 and can transmit, based on the received monitor and control signals, signal characteristic information regarding the antenna signal to the PSM 14 via the coaxial network.

Referring to FIG. 7, a first SA module (701) may be coupled or connected to coupler 232a to perform spectrum analysis of the signals coming from RF input 230 and managing the resulting spectrum information with modem 244. A second SA module (703) may be coupled or connected to coupler 234 to perform spectrum analysis of the signals coming from coupler 232a and managing the resulting spectrum information with modem 244. A third SA module (705) may be coupled or connected to coupler 234 to perform spectrum analysis of the signals being fed to or coming from/reflected from RF coupled port 250 and managing the resulting information with modem 244. A fourth SA module (707) may be coupled or connected to coupler 232b to perform spectrum analysis of the signals being fed to or coming from/reflected from RF output 252 and managing the resulting information with modem 244.

In one implementation the Public Safety Monitor (PSM) includes a microcontroller that pools each SN, requesting the microcontroller or modem of the SA module information about the power measured per channel. Each SA module receives instructions from the PSM microcontroller with respect to which channels to monitor (for example, the PSM may instruct the SAs to take power measurements for specific range of channels or for a specific channel). When the PSM receives the information requested from the SA modules, the PSM may transmit (e.g., via ethernet connection) the received information to a server which may be used to present the information collected to a user or operator on a graphical user interface, allowing the user or operator to see the power levels received by each antenna in the DAS for or in each channel. Also, since all measurements may be taken by each SA module of each SN at the same time (e.g., the PSM may send a synchronization clock signal to each SA module), then the location of each radio in the area where antennas in the DAS are located can be determined through antenna triangulation.

In one embodiment, each radio in the coverage area of the DAS may transmit signals on a given channel at a time (for TDMA the power would be measured for each time slot), then the location of a transmitting radio can be ascertained based on signal amplitude and on the availability of at least three antennas, so that the user or operator of the system is able to know, for example, where each firefighter is located inside a building constituting the coverage area (assuming that the user or operator is the Network Operations Center or NOC of a fire department).

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means—plus-function format and are not intended to be interpreted based on 35 U.S.C. 112(f), unless and until such claim limitations expressly use the phrase "means for" followed by a statement of function void of further structure.

What is claimed:

1. A system for monitoring passive components of a passive distributed antenna system comprising:
a bi-directional amplifier, a public safety monitor coupled to and in communication with the bi-directional amplifier, and at least one smart node coupled to and in communication with the public safety monitor, wherein the at least one smart node is positioned within the passive distributed antenna system and includes a processor, connected to or coupled to a spectrum analysis module configured to monitor signal characteristic information of at least one radio frequency signal passing through the passive distributed antenna system, and wherein the processor is configured to transmit the signal characteristic information to the public safety monitor, wherein the public safety monitor generates system performance information based on a signal at the bi-directional amplifier and the transmitted signal characteristic information.

2. The system of claim 1, wherein the at least one smart node is coupled to and in communication with one or more additional smart nodes.

3. The system of claim 1, wherein the public safety monitor transmits the generated system performance information via a modem to a user of the system.

4. The system of claim 1, wherein the at least one smart node is coupled to the public safety monitor via a coaxial cable.

5. The system of claim 1, wherein the monitored signal characteristic information is a voltage standing wave ratio.

6. The system of claim 1, wherein the processor is an Internet of Things microprocessor.

7. The system of claim 1, wherein the smart node further includes a battery and the battery powers the smart node.

8. The system of claim 1, wherein the smart node further includes a bias tee and the bias tee powers the smart node.

9. The system of claim 1, where in the smart node further includes a USB bridge and the USB bridge powers the smart node.

10. The system of claim 1, wherein the smart node further includes a radio frequency power harvesting component and the radio frequency power harvesting component powers the processor by converting radio frequency energy to direct current.

11. The system of claim 1, wherein the smart node further includes a radio frequency power harvesting component having an energy storage device, the radio frequency power harvesting component converting radio frequency energy to direct current and storing the direct current in the energy storage to power the processor.

12. The system of claim 11, wherein the energy storage device is one of a battery and a capacitor.

13. The system of claim 11, wherein the smart node further includes a battery and the energy storage device is a capacitor such that capacitor powers the smart node and when the capacitor is discharged the battery powers the smart node.

14. The system of claim 1, wherein the at least one smart node is housed in aluminum housing or constructed with a conversion coating.

15. The system of claim 1, wherein the smart node operates within the 100 MHz to 1 GHz frequency range.

* * * * *